United States Patent
Baxter et al.

(10) Patent No.: US 8,764,885 B2
(45) Date of Patent: Jul. 1, 2014

(54) SYSTEMS AND METHODS FOR SEPARATING CONDENSABLE VAPORS FROM GASES BY DIRECT-CONTACT HEAT EXCHANGE

(75) Inventors: Larry L. Baxter, Provo, UT (US); Christopher S. Bence, Provo, UT (US)

(73) Assignee: Sustainable Energy Solutions, LLC, Orem, UT (US)

( * ) Notice: Subject to any disclaimer, the term of this patent is extended or adjusted under 35 U.S.C. 154(b) by 344 days.

(21) Appl. No.: 13/301,731

(22) Filed: Nov. 21, 2011

(65) Prior Publication Data

US 2012/0153514 A1    Jun. 21, 2012

Related U.S. Application Data

(60) Provisional application No. 61/548,229, filed on Nov. 19, 2010.

(51) Int. Cl.
*B01F 3/04*    (2006.01)

(52) U.S. Cl.
USPC .................. 95/226; 95/228; 95/290; 96/236; 96/240; 96/311; 96/329

(58) Field of Classification Search
CPC ...... B01F 3/04; B01D 53/002; B01D 5/0027; B01D 5/003; F28B 3/06; F28B 3/00

USPC ............ 95/149, 226, 228, 288, 290; 96/243, 96/236, 240, 311, 329; 62/54.1, 601; 261/121.1

See application file for complete search history.

(56) References Cited

U.S. PATENT DOCUMENTS

| | | |
|---|---|---|
| 3,400,512 A | 9/1968 | McKay |
| 4,769,054 A | 9/1988 | Steigman |
| 5,956,971 A | 9/1999 | Cole et al. |
| 2008/0188819 A1 | 8/2008 | Kloke et al. |

FOREIGN PATENT DOCUMENTS

| | | |
|---|---|---|
| FR | 2940414 | 12/2008 |
| WO | WO 2010/045705 | 4/2010 |
| WO | WO 2011/097043 | 8/2011 |

OTHER PUBLICATIONS

PCT/US2011/061737, Feb. 14, 2012, International Search Report.

*Primary Examiner* — Robert A Hopkins
(74) *Attorney, Agent, or Firm* — Workman Nydegger

(57) ABSTRACT

Condensable vapors such as carbon dioxide are separated from light gases in a process stream. The systems and methods employ a direct exchange heat exchanger to desublimate the condensable vapors from the process stream. The condensable vapors are condensed by directly contacting a heat exchange liquid in the direct contact heat exchanger while the uncondensed light gases from the process stream form a separated light-gas stream. The separated light-gas stream can be used in a recuperative heat exchanger to cool the process stream.

27 Claims, 8 Drawing Sheets

SYSTEMS AND METHODS FOR SEPARATING CONDENSABLE VAPORS FROM GASES BY DIRECT-CONTACT HEAT EXCHANGE

CROSS-REFERENCE TO RELATED APPLICATIONS

The present application claims the benefit of and priority to U.S. Provisional Patent Application Ser. No. 61/458,229 filed Nov. 19, 2010 and entitled METHOD FOR A DESUBLIMATING HEAT EXCHANGER, which is incorporated herein by reference in its entirety.

BACKGROUND

1. The Field of the Invention

The present invention relates to systems and methods for separating condensable vapors (e.g., carbon dioxide) from gases by desublimating the condensable vapors in a heat exchange liquid.

2. The Related Technology

The separation of carbon dioxide from other light gases such as nitrogen is important for achieving carbon dioxide sequestration. Flue gas from a conventional power station typically includes from about 4% (vol.) to about 16% (vol.) carbon dioxide ($CO_2$). It is commonly believed that this $CO_2$ represents a significant factor in increasing the greenhouse effect and global warming. Therefore, there is a clear need for efficient methods of capturing $CO_2$ from flue gases so as to produce a concentrated stream of $CO_2$ that can readily be transported to a safe storage site or to a further application. $CO_2$ has been captured from gas streams by several technologies, the most common of which include: oxyfiring, where oxygen is separated from air prior to combustion, producing a substantially pure $CO_2$ effluent; absorption, where $CO_2$ is selectively absorbed into liquid solvents; membranes, where $CO_2$ is separated by semi-permeable plastics or ceramic membranes; adsorption, where $CO_2$ is separated by adsorption on the surfaces of specially designed solid particles; chemical looping, where carbon oxidation and oxygen consumption are physically separated by a recycled intermediate, typically metal oxide; and low temperature/high pressure processes, where the separation is achieved by condensing the $CO_2$.

In the past, the most economical technique to capture $CO_2$ from a flue gas has been to scrub the flue gas with an amine solution to absorb the $CO_2$. This technology has been used commercially for small-scale processes and for specialty processes. However, it has not been adopted in utility-scale power plants, primary because the technology causes an unacceptable decrease in the total efficiency of the power plant.

Another type of process that has received significant attention is the oxy-combustion systems, which uses oxygen, usually produced in an air separation unit (ASU), instead of air, for the combustion of the primary fuel. The oxygen is often mixed with an inert gas, such as recirculated flue gas, to keep the combustion temperature at a suitable level. Oxy-combustion processes produce flue gas having $CO_2$, water and $O_2$ as its main constituents; the $CO_2$ concentration being typically greater than about 70% by volume. Treatment of the flue gas is often needed to remove air pollutants and non-condensed gases (such as nitrogen) from the flue gas before the $CO_2$ is sent to storage.

BRIEF SUMMARY

The present disclosure describes systems and methods for separating condensable vapors (e.g., carbon dioxide) from other gases (e.g., nitrogen) in a continuous separation process. The separation process is carried out in a direct contact heat exchanger (DCHE), in which a process stream comprising condensable vapors and light gases come in direct, physical contact with a non-volatile heat exchange liquid (NVHEL). The NVHEL cools the process stream and causes the condensable vapors to desublimate, thereby forming a slurry of desublimated solids and the NVHEL. The desublimation of the condensable vapors also causes separation of the vapors from other gases in the process stream, thereby forming a separated light-gas stream.

Condensed solids such as, but not limited to, carbon dioxide can be melted at elevated pressures to form a liquid and sequestered using any suitable sequestration technique. For example, the separated carbon dioxide can be injected into an aquifer or other suitable underground reservoir.

The use of a DCHE produces a net effect of exchanging heat between the desublimating process stream and the NVHEL. However, it accomplishes this without subjecting any stationary heat transfer surface to frosting, fouling, or any other heat-transfer-inhibiting mass accumulation. The NVHEL is the heat transfer surface on which the solids can accumulate, and their accumulation in the liquid does not impede heat transfer in the DCHE. The heat exchange in the DCHE is by direct contact and is more efficient than through a heat exchange wall. Furthermore, the DCHE is a liquid-fluid system, which is far more efficient than gas-fluid systems in other heat exchangers.

One embodiment of a method for separating condensable vapors from gases includes all or a portion of the following steps: (i) providing a process stream that includes condensable vapors and light gases; (ii) cooling the process stream using one or more up-stream heat exchangers; (iii) providing a DCHE unit including a NVHEL in a vessel; (iv) introducing the process stream into the DCHE downstream from the one or more up-stream heat exchangers and causing the process stream to come in direct physical contact with the NVHEL; (v) cooling the process stream under a temperature and pressure sufficient to cause at least a portion of the condensable vapors in the process stream to desublimate in the NVHEL so as to form cooled light gases and a slurry comprising desublimated solids and the NVHEL; (vi) removing the separated light-gas stream from the vessel through the light gas outlet; and (vii) separating at least a portion of the desublimated solids from the NVHEL.

In one embodiment, the method includes using a process stream that includes carbon dioxide and operating the separation unit at a temperature and pressure suitable for desublimating carbon dioxide.

In one embodiment, the NVHEL downstream from the DCHE passes through a recirculation heat exchanger (RHE), and recirculates to the DCHE. Some fraction of the NVHEL will potentially vaporize in the DCHE. The amount of vaporization can be minimized by selecting a liquid or liquid mixture with minimal vapor pressure. Examples of suitable non-volatile materials include methyl cyclopentane, methyl cyclohexane, a variety of fluorinated or chlorinated hydrocarbons, or any compound or solution that has low vapor pressure at the temperature of system operation, has a manageable viscosity, and has no materials incompatibilities or unmanageable health and safety issues, including mixtures of such compounds.

In one embodiment, the NVHEL in the slurry stream is first separated from the solids by a clarifier. This separation can be accomplished through filtration, hydroclone, settling, or any other solid separation technique suitable to the fluids. The clarified NVHEL then cools in the RHE and recirculates to the DCHE.

During desublimation, some fraction of the desublimated solids and light gases may dissolve in the NVHEL. This, however, is not a problem in a continuously recirculating system as the NVHEL will quickly saturate in dissolved materials, at which point there should be no further dissolution. Furthermore, there is little chance that the dissolved materials will precipitate on the heat exchange surfaces of the RHE, since the clarified NVHEL is warmer than the RHE and therefore generally has a higher carrying capacity for dissolved gases and solids than the RHE environment. The NVHEL should dissolve materials away from the recirculating heat exchanger surfaces rather than depositing it there.

The systems and methods described herein can be carried out at any temperature and pressure suitable for desublimating condensable vapors in a process stream. In one embodiment, the pressure in the vessel can be relatively low, such as a pressure in a range from about ambient pressure to about 15 psig or ambient to about 10 psig, or ambient to about 5 psig. In an alternative embodiment, the pressure can be relatively high such as in a range from about 5 psig to about 1000 psig or greater or 20 psig to about 500 psig. Where carbon dioxide is to be desublimated, the temperature and pressure within the bed of particles are selected for transforming gaseous carbon dioxide directly to solid carbon dioxide. The temperatures and pressures for desublimating carbon dioxide are well-known. For example, at ambient pressure, carbon dioxide vapors at 15% vol concentration desublimate from flue gases at a temperature of less than about −100° C. and 90% of the $CO_2$ desublimates at temperatures of about −120° C.

In one embodiment, the DCHE can be operated at modest or high pressure such that the exiting light-gas stream can be further cooled by expansion downstream. In one embodiment, a separated light-gas stream having a pressure greater than about 5 psi, greater than about 20 psi, or greater than about 50 psi is expanded to cool the separated light-gas stream to a temperature that is below the temperature of the RHE. This additional cooling of the separated light-gas stream can cause desublimation of a residual portion of condensable vapors in the separated light-gas stream. A solids separation apparatus can remove solids that form in the expansion of the separated light-gas stream. The cooled separated light-gas stream can then be transferred to the RHE, thereby drawing heat from the recirculating NVHEL.

In an alternative embodiment, the RHE can be cooled using means other than the separated light-gas stream. In one embodiment, the RHE can include a refrigeration unit. In this embodiment, any refrigeration system can be used that is capable of achieving the desired temperatures for cooling the NVHEL in the RHE. In a preferred embodiment, such refrigeration systems include heat integration and recovery such that most of the cooling the refrigerant occurs by heating the returning flue gas and purified $CO_2$ stream.

The systems and methods described herein can also include cooling steps carried out upstream from the separation unit. Prior to introducing the process stream into the vessel, the process stream is typically cooled using one or more heat exchangers. In the initial cooling process, the process stream can be dried to remove water. In one embodiment, the process stream is cooled using one or more recuperative, upstream heat exchangers, which cool the process stream using the separated light-gas stream. The separated light-gas stream can be used in the recuperative recirculating heat exchangers, or the recuperative upstream heat exchangers, directly upstream or downstream from the DCHE vessel, or alternatively, the separated light-gas stream can be first cooled by an expansion device before entering the recuperative heat exchangers.

In one embodiment, the solids separated from the slurry are used in the one or more up-stream heat exchangers to cool the process stream.

Increasing the contact surface area between the NVHEL and the process stream can facilitate desublimation. To maximize the contact surface area, the system described herein may include a DCHE vessel with a packing material such as screens, discs, or variably shaped three dimensional items.

The system may also include an interior sprayer that produces NVHEL droplets in the DCHE. In an alternative embodiment, the DCHE includes a sparger in fluid communication with the process stream, producing process stream gas bubbles and sparging a circulating reservoir of NVHEL in the DCHE vessel.

One embodiment of the system pressurizes the NVHEL-$CO_2$ slurry prior to complete separation of the NVHEL from the $CO_2$, taking advantage of the ability of the slurry to pass through pumps. The slurry pump both increases the solid pressure to the point it can melt to form a liquid and facilitates separation of the solid $CO_2$ particles from the NVHEL.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

The systems and methods disclosed herein relate to separating condensable vapors from a process stream (e.g., the flue gas from a power plant) to form a solid and a separated light-gas stream. For example, in one embodiment, the methods and systems relate to condensing carbon dioxide vapors from a process stream that includes carbon dioxide and nitrogen. The systems and methods of the invention can be used to separate condensable vapors in any process stream that includes a mixture of gases, some of which can be readily caused to change phase. The process stream is typically produced in a hydrocarbon processing plant or sometimes in $CO_2$ sensitive air supplies for life support. Examples of hydrocarbon processing plants and breathing air supply systems that produce a stream suitable for use in the present invention include, but are not limited to coal fired power plants, natural gas fired power plants, fuel oil fired power plants, biomass fired power plants, petrochemical process streams, ambient air in confined or closed spaces such as submarines, natural gas purification streams, syngas or producer gas streams from gasifiers, exhaust from stationary and possibly mobile gasoline, diesel, or similar engines, and black-liquor combustion or gasification effluents. While the present invention is particularly advantageous for use with process streams from power plants, the invention can also be used with other industrial process streams, such as, but not limited to process streams from petroleum refining.

I. Systems for Condensing Vapors

Figure 1:
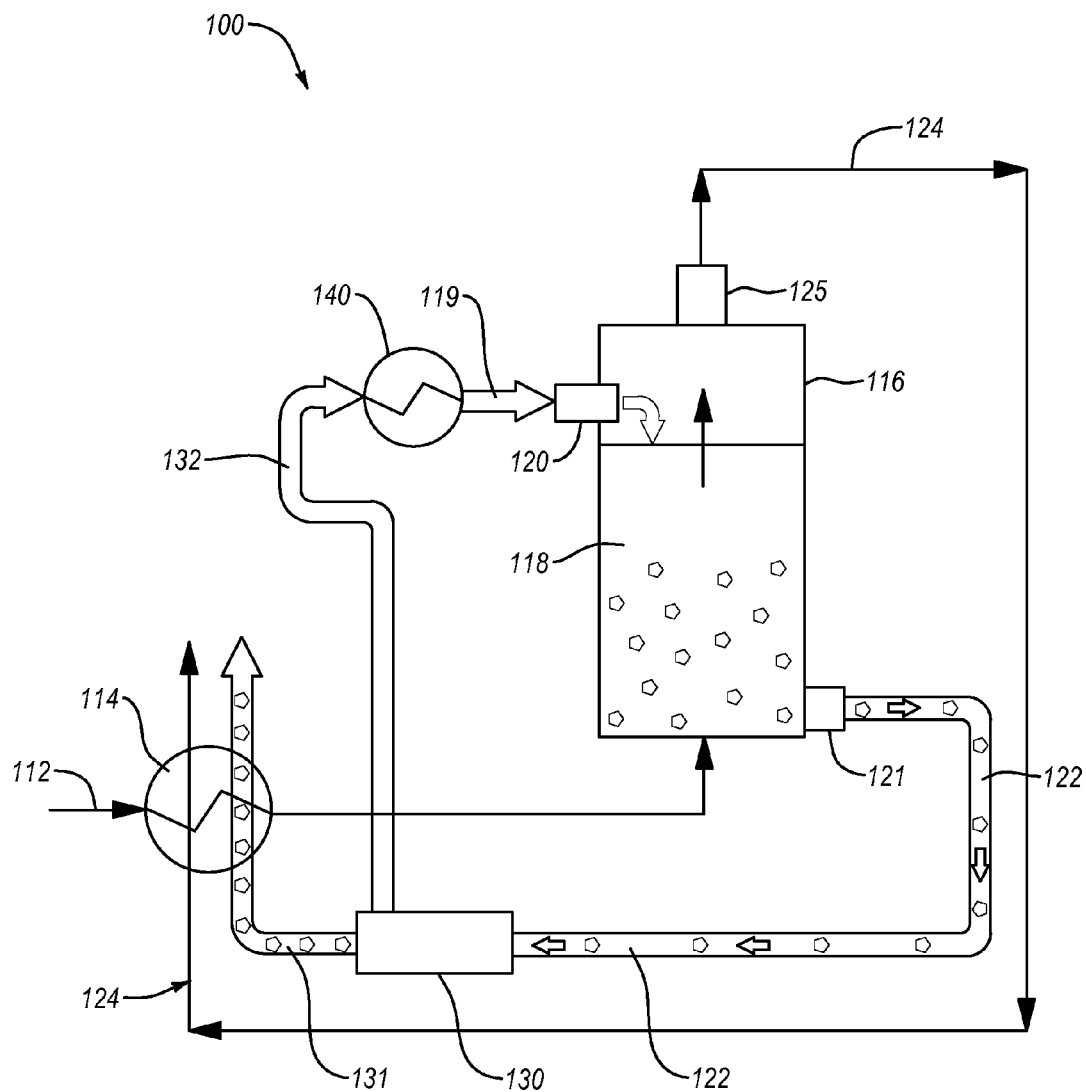
FIG. 1 is a schematic diagram of a system for separating condensable vapors from gases.

FIG. 1 is a schematic diagram of an illustrative system 100 for separating condensable vapors from gases. System 100 includes a process stream 112 in fluid communication with a recuperative upstream heat exchanger (UHE) unit 114. The UHE 114 cools the process stream to a temperature near the condensation point of condensable vapors present in the process stream 112. The process stream 112 flows to a DCHE vessel 116 that includes a direct contact zone 118.

The DCHE vessel 116 includes an NVHEL inlet 120 through which an NVHEL 119 enters the DCHE vessel 116. The NVHEL can be any fluid with a freezing point below the frost or dew point of the condensable vapors and that is non-volatile or has low volatility. The low volatility minimizes the amount of NVHEL that escapes the DCHE, which minimizes environmental impacts and costs. Examples of suitable NVHEL include, but are not limited to methyl cyclopentane, methyl cyclohexane, a variety of fluorinated or chlorinated hydrocarbons, or any compound or solution that has low vapor pressure at the temperature of system operation, has a manageable viscosity, and has no materials incompatibilities or unmanageable health and safety issues, including mixtures of such compounds. When available, ionic solutions of such compounds are especially useful.

In a direct contact zone 118 in the vessel 116, the process stream 112 comes in direct contact with the NVHEL 119 that is colder than the desublimation temperature of the condensable vapors in the process stream 112, causing heat exchange between the process stream and the NVHEL, and resulting in desublimation of the condensable vapors on the contact surface of NVHEL. As the condensable vapors desublimate and form solids, light gases in stream 112 separate from the solids and form a light-gas stream 124, which then exits the NVHEL vessel 116 via the light-gas stream outlet 125.

A slurry comprising the condensed solids and the NVHEL exits the DCHE vessel 116 through the solids/NVHEL outlet 121 as a slurry stream 122. At this point, a pressurizing pump (not shown) may be incorporated in the process to raise the slurry pressure to arbitrarily high levels, which (a) pressurizes the solid, (b) facilitates the solid-liquid separation in the clarifier, and (c) drives the recirculation of the NVHEL. A solids separation apparatus 130 (e.g., a clarifier) downstream of the solids/NVHEL outlet 121 separates the solids in the slurry stream 122 from the NVHEL, forming a solids stream 131 and a clarified NVHEL stream 132. The solids stream 131 and/or the light gas stream 124 are then used to cool the process stream 112 in the recuperative upstream heat exchanger (UHE) 114, and the clarified NVHEL stream 132 is cooled by a recirculating heat exchanger (RHE) 140 before being recirculated to the DCHE vessel 116. Not shown in FIG. 1 but equally feasible is a configuration where the clarifier 130 is downstream of the UHE 114 and upstream of the RHE 140.

The light-gas stream 124 and optionally the condensed-phase stream 131 cool the process stream 112 in UHE 114, which may be either desublimating or not, or (not shown but equally valid) the NVHEL in a heat exchanger similar to 140 but in a previous stage of a staged system. Cooling the process stream 112 using light-gas stream 124 and/or solids stream 131 recovers a portion of the energy expended in cooling stream 112. This recuperative process improves the efficiency of the overall separation system 100. The preferred embodiment involves streams 124 and 131 cooling incoming streams with small temperature differences between them. Portions of streams 124 and 131 may be separated to provide cooling in more than one region of the overall process.

The UHE 114 can include any number of compressors, heat exchangers, fans, pumps, conduits, valves, sensors, controllers, and other components known in the art for cooling, drying, pressurizing, and/or purifying a process stream.

The configuration shown in FIG. 1 can be staged any number of times to provide efficient removal of impurities over a range of temperatures, with such staging occurring preferably such that all heat exchange occurs countercurrently or optionally with some or all heat exchanger occurring cross currently or co-currently.

Figure 2:
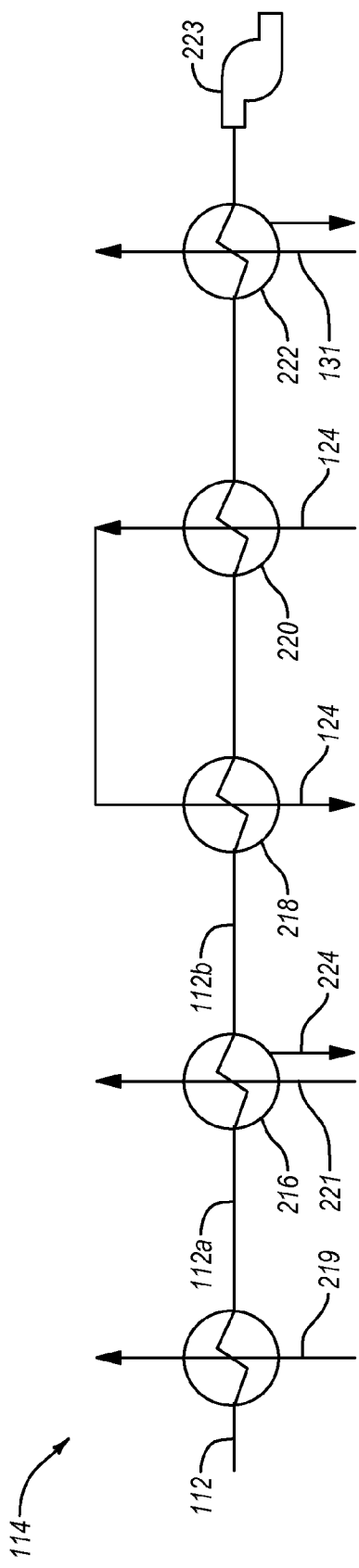
FIG. 2 is a schematic diagram of upstream heat exchangers for cooling a process stream upstream of a DCHE vessel.

FIG. 2 provides an illustrative example of a UHE 114 including a plurality of heat exchangers 214, 216, 218, 220, and 222. Process stream 112 is first typically cooled to ambient temperatures using water and/or air in one or more cooling processes. For example, water 219 can be used to cool process stream 112 using techniques known in the art to produce a process stream 112a at ambient temperature. In a second heat exchanger, process stream 112a is cooled in the second heat exchanger 216 to condense any water vapors that may exists in process stream 112a to produce a dry process stream 112b. Process stream 112a can be cooled using any suitable coolant 221. Coolant 221 can be provided from streams 122 and/or 124 or be cooled using non-recuperative techniques known in the art, such as, but not limited to an external refrigeration unit, a salt-solution technique, or a staged cooling technique. The second heat exchanger 216 can include a separator for removing condensed water 124. Residual water may be removed using absorption, salt solution, pressurization, or other techniques known in the art.

Dry process stream 112b can be introduced into any number or any type of heat exchangers to cool the process stream to a temperature just above the condensation temperature of the condensable vapors present in the process stream (i.e., the condensable vapors to be removed through the slurry). FIG. 2 shows the process stream 112b being introduced into a series of heat exchangers 218, 220, and 222 and then through a fan 223. The fan or compressor 223 is alternatively and preferably placed earlier in the process where the process streams are near or above ambient temperature. Heat exchangers 218, 220, and 222 cool the process stream to a temperature just above the frost or dew point of the condensable vapors and the fan 223 provides pressure for injecting the cooled process stream into separation vessel 116.

In one embodiment, cold separated light-gas stream 124 flows through heat exchangers 218 and 220 as a coolant. In heat exchangers 218 and 220, separated light-gas stream 124 may flow counter to the flow of the process stream 112b such that the colder portions (i.e. upstream portions) of stream 124 are in thermal contact with the colder portions (i.e. downstream portions) of stream 112b.

Flowing the light-gas stream 124 counter to the flow of dry process stream 112b can be done through multiple heat exchangers using any number of heat exchangers necessary to achieve a desired cooling efficiency. Alternatively, or in addition to using multiple heat exchangers, the light-gas stream 124 and the process stream 112b can have counter flow within a single heat exchanger. For example, heat exchangers that include conduits with parallel flow for the process stream 112b and the light-gas stream 124 can include a counter directional flow. Counter flow can be beneficial to ensure that the coldest portion of the light-gas stream 124 comes into contact with the coldest dry process stream 112b, which enables the coldest temperatures to be achieved for process stream 112b using the light-gas stream 124 as the coolant.

Using the cold separated light-gas stream 124 as the coolant in UHE 114 recuperates energy expended in cooling the gases to form the light-gas stream 124. Because the laws of thermodynamics prevent any closed system from achieving 100% efficiency and because the latent heat of desublimation/condensation associated with the condensing component of the process stream must be removed from the system, additional cooling of process stream 112 or of the NVHEL is needed at some point in system 100 to achieve the desired low temperature for condensing the vapors. If needed, a portion of the external cooling can be provided prior to vessel 116 to achieve the desired temperature for process stream 112 at the input of vessel 116.

Upstream heat exchanger (UHE) 114 can also include one or more heat exchanger for utilizing a desublimated solids stream 131 to cool process stream 112. Solids stream 131 can be melted and/or heated to cool process stream in an upstream heat exchanger 222. In an illustrative embodiment, upstream heat exchanger 222 cools process stream 112 downstream from heat exchanger 220. In an alternative embodiment, solids stream 131 can be used in a heat exchanger upstream from the recuperative heat exchangers using light-gas stream 124 as a coolant (e.g., heat exchangers 218 and 220). Solids stream 131 can also be used in any number of heat exchangers to provide a desired cooling efficiency.

UHE 114 can also be configured to remove one or more different types of impurities prior to vessel 116. Impurities are often found in the process streams as a consequence of using natural products such as coal and petroleum to produce the process stream. In one embodiment, the process stream can include, but is not limited to, mercury, NOx, SOx, HCl, residual moisture, combinations of these, and any other impurities known to be present in industrial process streams.

The impurities can be removed by condensing the impurity in a heat exchanger at a desired temperature and pressure. Any number of heat exchangers and/or compressors, and/or separation devices can be used to condense the impure vapors and separate them from process stream 112b to produce a purified dry process stream. The coolant used in the heat exchanger can be a separated light-gas stream 124, a solids stream 131 or a coolant from an external refrigeration unit or device of comparable functionality. The separation of the impurities is carried out by selecting a proper temperature and pressure at which the impurity will condense and the other condensable vapors (e.g., $CO_2$) do not condense. Alternatively, the impurities may condense with the $CO_2$ in vessel 116 and optionally be removed later in the process. Those skilled in the art are familiar with the temperatures and pressures needed to condense impurities typically found in a process stream. These impurities include but are not limited to oxides of sulfur and nitrogen ($SO_2$, $SO_3$, NO, $NO_2$), water at sub-freezing temperatures, halogenated gases (HCl, HgClx), mercury, arsenic compounds, and other impurities common to flue gases and of operational, health, or environmental concern. Generally, these compounds desublimate or condense when temperatures of particles or surfaces are at or below the frost or dew points of these compounds. The actual desublimation and freezing points of these compounds when they exist as components of a mixture depend strongly on the mixture composition in ways that are complex, but well known to one skilled in the art of mixture thermodynamics.

Figure 3:
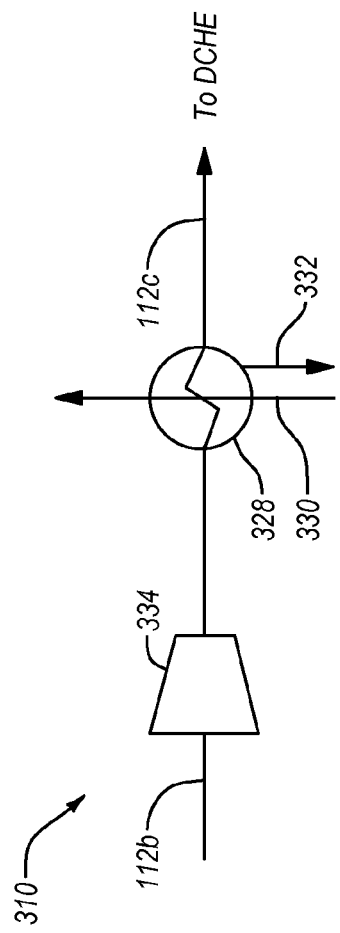
FIG. 3 is a schematic diagram of a heat exchanger for removing impurities from a process stream upstream from a separation vessel.

FIG. 3 illustrates a subsystem 310 of system 100 that can be used to remove impurities. Subsystem 310 includes conduit for carrying process stream 112b, which can be coupled to an optional compressor 334 and a heat exchanger/separator 328. Compressor 334 optionally compresses dry process stream 112b to a desired pressure for condensing the impurities in stream 112b. A coolant 330 is used in heat exchanger 328 to cool dry process stream 112b to a temperature suitable for condensing one or more impurities to form a liquid impurities stream 332. The liquid impurities stream is withdrawn from heat exchanger/separator 328 to produce a purified process stream 112c. Purified process stream 112c can then be further processed to remove additional impurities, cooled to a colder temperature, and/or introduced into vessel 116. Liquid impurities stream 332 can be further processed into desirable products and/or disposed of and/or used to cool process stream 112 upstream from being separated (i.e., in a recuperative heat exchanger process).

The impurities can be condensed and removed from process stream 112b prior to vessel 116 to minimize the concentration of impurities in the solids stream 131, which will typically be sequestered, and minimize the concentration of impurities in separated light-gas stream 124, which will typically be vented to the atmosphere.

In one embodiment, system 100 can include one or more compressors upstream from vessel 116. The use of compressors can reduce the volume of the process stream, thereby making it easier to handle large flows. The number of compressors and heat exchangers can depend in part on the desired operating pressure of the separation system 100. Where ambient pressure or relatively low pressure (e.g., ambient to 10 psi) is desired, one compressor or even just a fan pump can be sufficient for maintaining pressure. Where high pressure (e.g., tens of psi to hundreds of psi) is desired, a plurality of compressors or compressor stages, optionally with stages and interstage cooling and heat exchangers, can be used in recuperative heat exchanger unit 114. A staged compressor/heat exchanger system for high pressure improves the efficiency of cooling and compressing the process stream.

In one embodiment, the pressure in the vessel can be relatively low, such as a pressure in a range from about ambient pressure to about 15 psi or ambient to about 10 psi, or ambient to about 5 psi. In an alternative embodiment, the pressure can be relatively high such as in a range from about 5 psi to about 1000 psi or greater or 20 psi to about 500 psi.

Residual NVHEL contained in stream 131 can be separated after solids melt through decanting a NVHEL-rich phase from a $CO_2$-rich phase, through filtration, using a filter press, or through other solid-liquid or liquid-liquid separation process known to those skilled in the art of such separations.

FIGS. 2 and 3 illustrate examples of embodiments where process stream 112 is purified, cooled, and pressured for introduction into vessel 116. Those skilled in the art will recognize that the particular equipment and order within the process stream can vary from that described in FIGS. 2 and 3 while still performing the functions useful for the systems of the invention.

Figure 4:
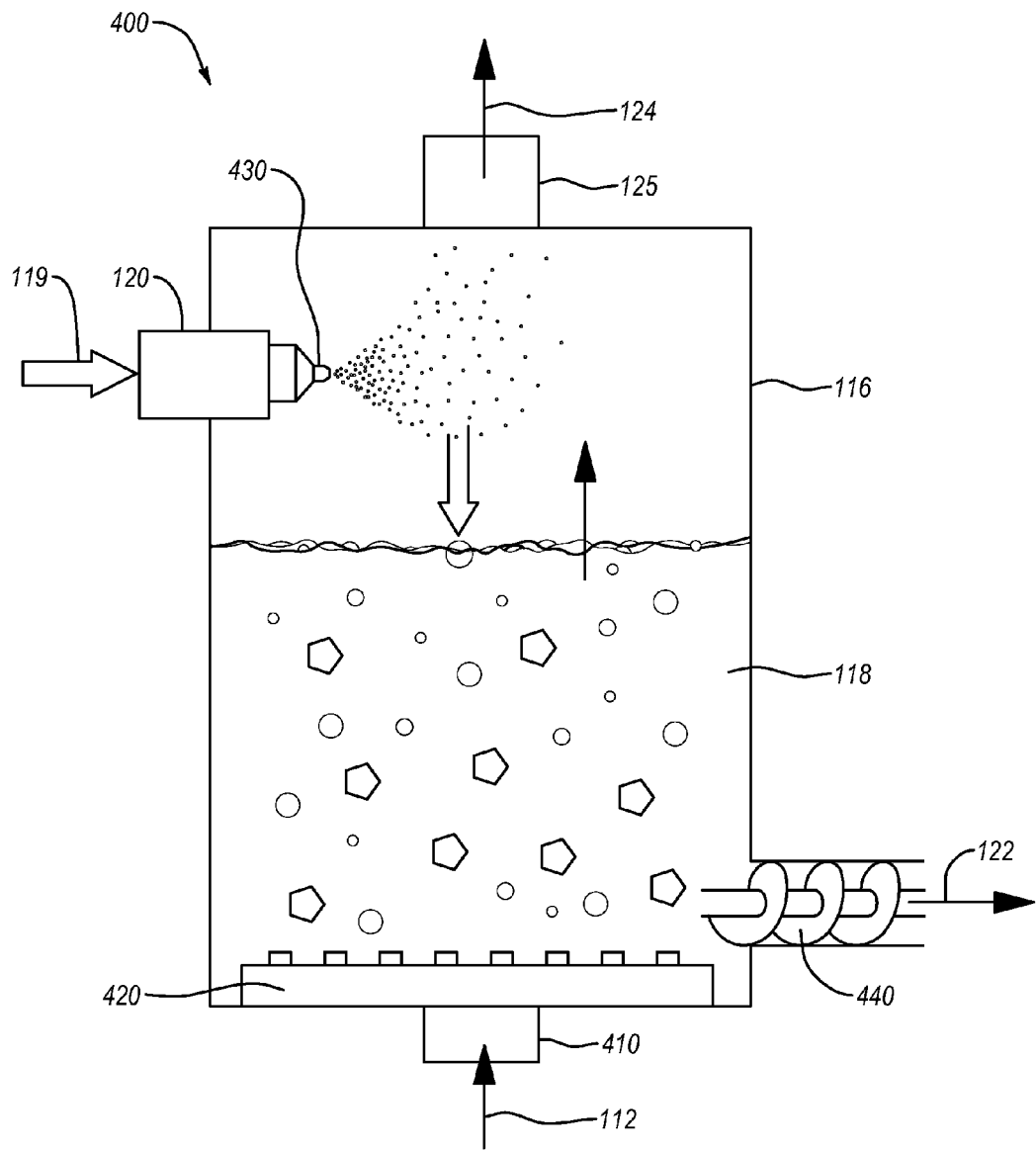
FIG. 4 illustrates a DCHE vessel of the system of FIG. 1.

FIG. 4 illustrates one embodiment of a DCHE unit 400 in additional detail. The DCHE includes a vessel 116, a direct contact zone 118 within the vessel 116, a NVHEL inlet 120, a process stream inlet 410, a light-gas outlet 125, and a solids/NVHEL outlet (121). Vessel 116 is sized and configured to hold a slurry having a suitable volume for handling the volume of process stream to be treated. Typically vessel 116 size varies in proportion to the volumetric flow rates of the gas stream, which vary widely from one application to another. Sizes of relevance to this technology range from 1 cm to many meters or tens of meters. However, the diameter can vary depending on the number of vessels and the volume of process stream being treated. In one embodiment, the diameter of the vessel can be in a range from about 0.1 m to about 50 m or about 1 m to about 20 m. Vessel cross section typically increases approximately in proportion to process volumetric flow rate. The illustrated atomization or spray of NVHEL indicated in the figure is optional. Alternative injection techniques, including injection directly into the slurry 118 are also equally valid and in some cases preferred.

Vessel 116 can have any shape suitable for accommodating a slurry and a direct contact zone. Typical shapes include columnar vessels having a rectangular or circular cross section. Vessels with a circular cross section can be advantageous where high pressures are involved.

The process stream inlet 410 is coupled to a distribution apparatus 420. Gas introduced into process stream inlet 410 is distributed through the distribution apparatus 420, which serves as a manifold for delivering the volume of gas into direct contact zone 118 with an appropriate bubble size and sufficient flow resistance to prevent backflow of the NVHEL.

Figure 5:
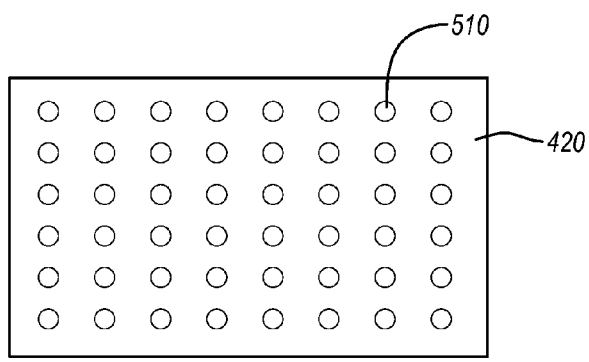
FIG. 5 illustrates a top view of a distribution apparatus of the DCHE vessel of FIG. 4.

As shown in FIG. 5, suitable distribution apparatus 420 includes a plurality of nozzles 510 that provide a desired pattern and pressure for injecting the process stream into the direct contact zone 118. Any distribution apparatus with a plurality of nozzles can be used so long as the size, configuration, and spacing of the nozzles is appropriate for obtaining the distribution and pressure of process stream needed to cause the desired flow through direct contact zone 118. For example, distribution apparatus 420 can have nozzles with a diameter in a range from about 2 mm to about 5 cm with various specific designs, including sieves, bubble caps, spargers, and related designs, and includes a density of nozzles in a range from about 1% coverage to about 90% coverage.

As indicated by FIG. 5, the DCHC vessel 116 has a rectangular cross-section, but it can be of shapes as required by factors such as operating environment, desired pressure, etc.

Typically the distribution apparatus 420 is positioned near the bottom of vessel 116. The light-gas outlet 125 is typically near the top of vessel 116 (i.e., above direct contact zone 118 during operation) such that flow of the process stream extends through direct contact zone 118.

Vessel 116 includes a NVHEL inlet 120 and a solids/NVHEL outlet 121 for adding NVHEL to and removing solids or NVHEL from vessel 116. Typically, the solids/NVHEL outlet is near the bottom of the bed and the NVHEL inlet is near the top of the vessel and/or the top of the direct contact zone 118 during use.

In this embodiment, after entering through the NVHEL inlet 120, NVHEL accumulates and forms a reservoir of NVHEL in the direct contact zone 118, typically in the lower portion of the vessel 116, submerging the distribution apparatus 420. The distribution apparatus 420 channels the process stream gases into the direct contact zone, forming gas bubbles and sparging the NVHEL. The direct contact between the process stream gases and the NVHEL cools the process stream and desublimates the condensable vapors, forming solids in the NVHEL. Light gases in the process stream are separated from the condensed vapors, forming a light-gas stream 124, which exits the vessel 116 through the light-gas outlet 125. The solids and NVHEL form a slurry 122 that exits the vessel 116 via the solids/NVHEL outlet 121.

Solids/NVHEL outlet 121 may optionally include augers or pumps 440 to facilitate removal of solids out of vessel 116. However, other known mechanisms for removing solids from a vessel can be used. Also, depending on the proportion of solids/NVHEL in the direct contact zone 118 and the viscosity of the slurry, an active removal mechanism may not always be required.

Using the process stream gases to sparge the NVHEL increases the contact surface area between the two phases, thus increasing the efficiency of the heat exchange between the two phases. To further increase the contact surface area, the NVHEL inlet 120 is optionally coupled to a sprayer 430 that sprays droplets of NVHEL into the direct contact zone 118 of the DCHE. The droplet size can be adjusted according to the pressure and temperature of the DCHE direct contact zone 118 to achieve optimal separation of the condensable vapors from the light gases in the process stream 112 while preventing droplet entrainment into the light gas exit stream 124.

Figure 6:
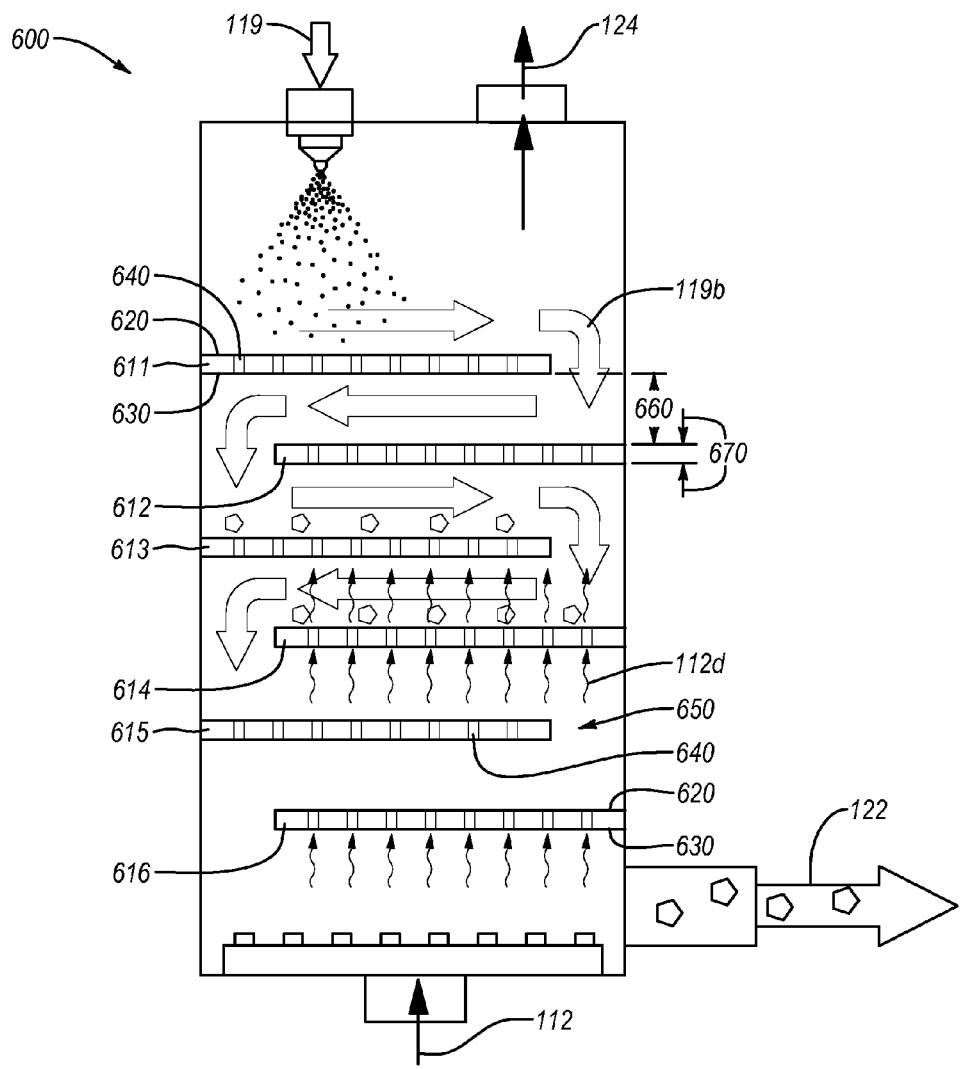
FIG. 6 illustrates an alternative design of the DCHE vessel of the system of FIG. 1.

FIG. 6 illustrates one embodiment of a DCHE unit 600 in additional detail. The inlets and outlets of DCHE 600 is analogous to those in DCHE 400 in FIG. 4. However, the direct contact zone 118 of DCHE 600 comprises e.g., porous plates such as dividers 611-616, each having a plurality of openings 640. Dividers 611-616 include a cutaway that creates an opening 650. The dividers 611-616 are typically positioned to be perpendicular to the plumb line, so that the NVHEL forms a layer on an upper surface of each divider and flows through the divider's larger opening 650 from the upper side to the lower side. Most preferably, the larger opening of 650 each divider is not aligned with the larger opening of any adjacent divider so as to cause a circuitous fluid flow 119b as indicated by the large arrows. In the upward direction (indicated by small arrows), the process stream 112d is forced by pressure differential through the multiple smaller openings 640 of dividers 611-616, directly contacting the NVHEL on the upper surface of the dividers 611-616.

Individual dividers 611-616 are spaced apart to provide space that allows the NVHEL stream to flow through the direct contact zone 118 forming a layer of NVHEL on the upper surface of each divider, and to allow the process stream 112d to flow through the dividers and the NVHEL layers on the dividers. In one embodiment, the gap distance 660 is in a range from about 0.5 to 100 cm, while divider thickness 670 may range from about 0.2 cm to 10 cm, although other sizes can be used if desired.

Figure 7:
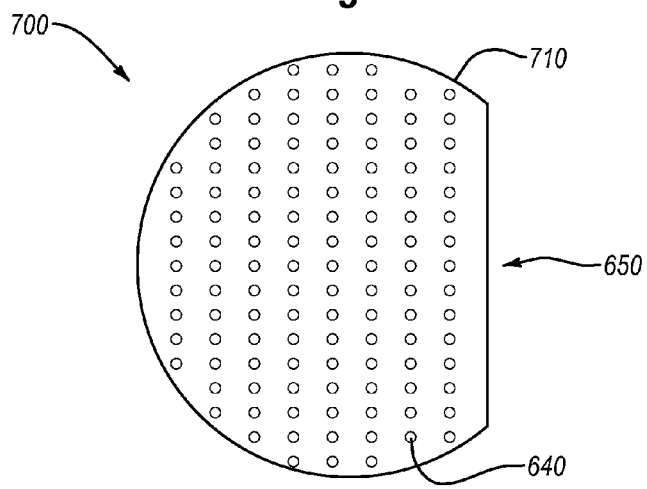
FIG. 7 is a top view of a divider in the DCHE vessel of FIG. 6.

FIG. 7 shows a top-view of a divider, which typically traverses the majority of the cross section of the direct contact zone 118. As indicated here, the shape of the divider 710 is circular. However, the shape of dividers can be any shape that provides the desired surface area and contact for cooling process stream 112d in the direct contact zone 118. Similarly, the diameter and numbers of the smaller opening 640, the diameter of the larger opening 650, and the number of dividers, may be adjusted to optimize flow rate of the NVHEL 119 and the process stream 112d, so as to achieve the desired contact surface area and contact duration. Those skilled in the art are familiar with the process parameters for creating a fluid flow that maintains a head pressure on an upflow process stream to cause intimate mixing. In one embodiment, the diameter of the smaller opening is in a range from 0.01 to 5 cm, and that of the larger opening from 1 to 20 cm. The density of the smaller opening may range from 10% to 90%, and the number of divider may range from one to hundreds. For various purposes, other sizes and numbers can be used if so desired. Not shown but preferred in this design are interstage exits of the NVHEL that allow removal of solids formation in the fluid and cooling of the NVHEL to compensate for the heat increase caused by latent heat of condensation associated with the condensing or desublimating vapors. In all cases, the fluid temperature must decrease as the fluid cascades through this system.

Figure 8:
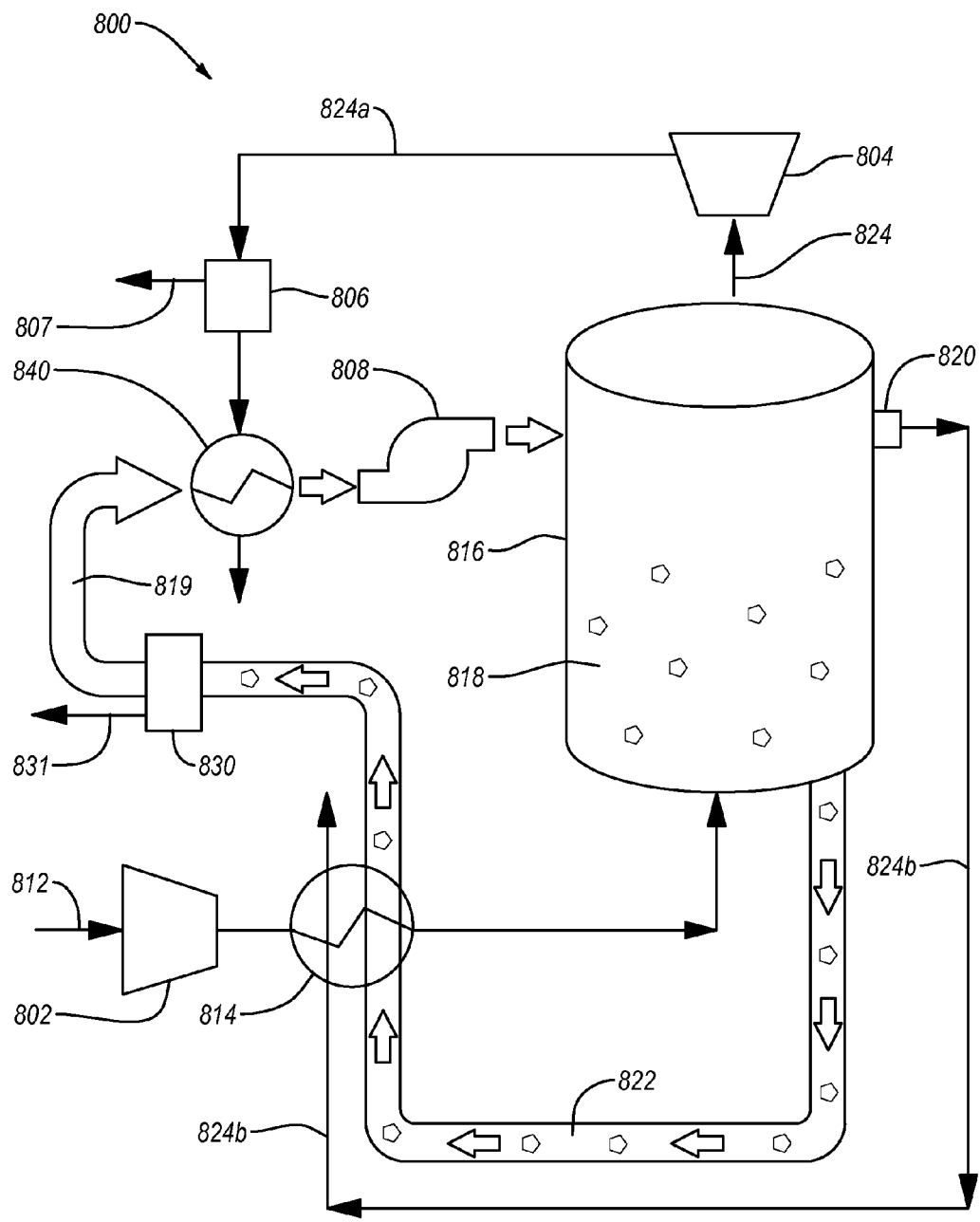
FIG. 8 is a schematic diagram of a system for separating condensable vapors from gases using elevated pressures.

FIG. 8 describe an alternative system 800 in which a separated light-gas stream 824 is used as the coolant in a recuperative recirculating heat exchanger (RHE) 840 to cool a recirculating NVHEL 819. System 800 includes a compressor 802 that pressurizes process stream 812. The pressure in process stream 812 is utilized downstream from DCHE 816 in an expansion process that cools light-gas stream 824 to a temperature suitable for use in the recuperative RHE. In one embodiment, system 800 is configured to operate at a pressure substantially above ambient pressure. For example, system 800 can be operated at a pressure in a range from about 0.5 atm to about 20 atm, more preferably about 1 atm to about 10 atm or about 1 atm to about 7 atm.

The expansion process utilizes an expander 804 downstream from the vessel 816. The cold separated light-gas stream 824 is expanded to a temperature below the temperature in the RHE 840. The lower temperature of expanded light-gas stream 824a allows stream 824a to be used as the coolant in the RHE 840. The expansion process may be used to avoid the need to use an external refrigeration unit.

In one embodiment, a solids separator 806 can be used to remove solids that may form during the expansion of light-gas stream 824 in expander 804. In some cases, light-gas stream 824 may have some condensable vapors that were not separated out in DCHE vessel 816. Expanding the light-gas stream 824 can cause an additional portion of the condensable vapors to form a solid. This additional condensation can remove additional amounts of $CO_2$ from system 800. The amount of solids generated from expansion of light-gas stream 824 is typically small compared to the mass of solids removed in DCHE direct contact zone 818.

The solids produced from expansion and separated using solids separator 806 can be combined with the solids stream 831 separated from a clarifier 830 upstream from the RHE 840 for further processing. To maintain pressure in vessel 816, recirculating NVHEL 819 can be pressurized using pressurizer 808 upon injection into vessel 816. In an alternative embodiment, the separated solids 807 and/or 831 can be melted and used in recuperative RHE 840 before further processing.

The process stream 812 is typically pressurized upstream from vessel 816. Process stream 812 can be pressurized using any number of compressors and heat exchangers. In one embodiment, a plurality of compressors and heat exchangers alternating in series are used to compress and cool process stream 812. Using alternating compressors and heat exchangers in series can improve the efficiency of reducing the temperature and increasing the pressure. System 800 can have a vessel 816 that is similar to vessel 116 as described in FIGS. 4-7 so long as vessel 816 is configured to withstand the operating pressure.

In one embodiment, the pressure within vessel 816 is at least about 5 psi, more preferably at least about 20 psi, and most preferably at least about 50 psi or even several hundred psi. Higher pressure allows for greater expansion and reduction in temperature for cooling the separated light-gas stream for use as the coolant in the RHE.

Operating at pressures above ambient pressure can also be advantageous for removing impurities from process stream 812 (e.g., using the structure described in FIG. 3 or a series of such equipment).

The system shown in FIG. 1 can be staged any number of times to provide efficient recovery of heat and/or removal of impurities over a range of temperatures. This system works in any of the classical heat exchange patterns, including countercurrent (FIG. 9A), cocurrent (FIG. 9B), and/or a hybrid of countercurrent and cocurrent (FIG. 9C), crosscurrent, etc.

Figure 9A:
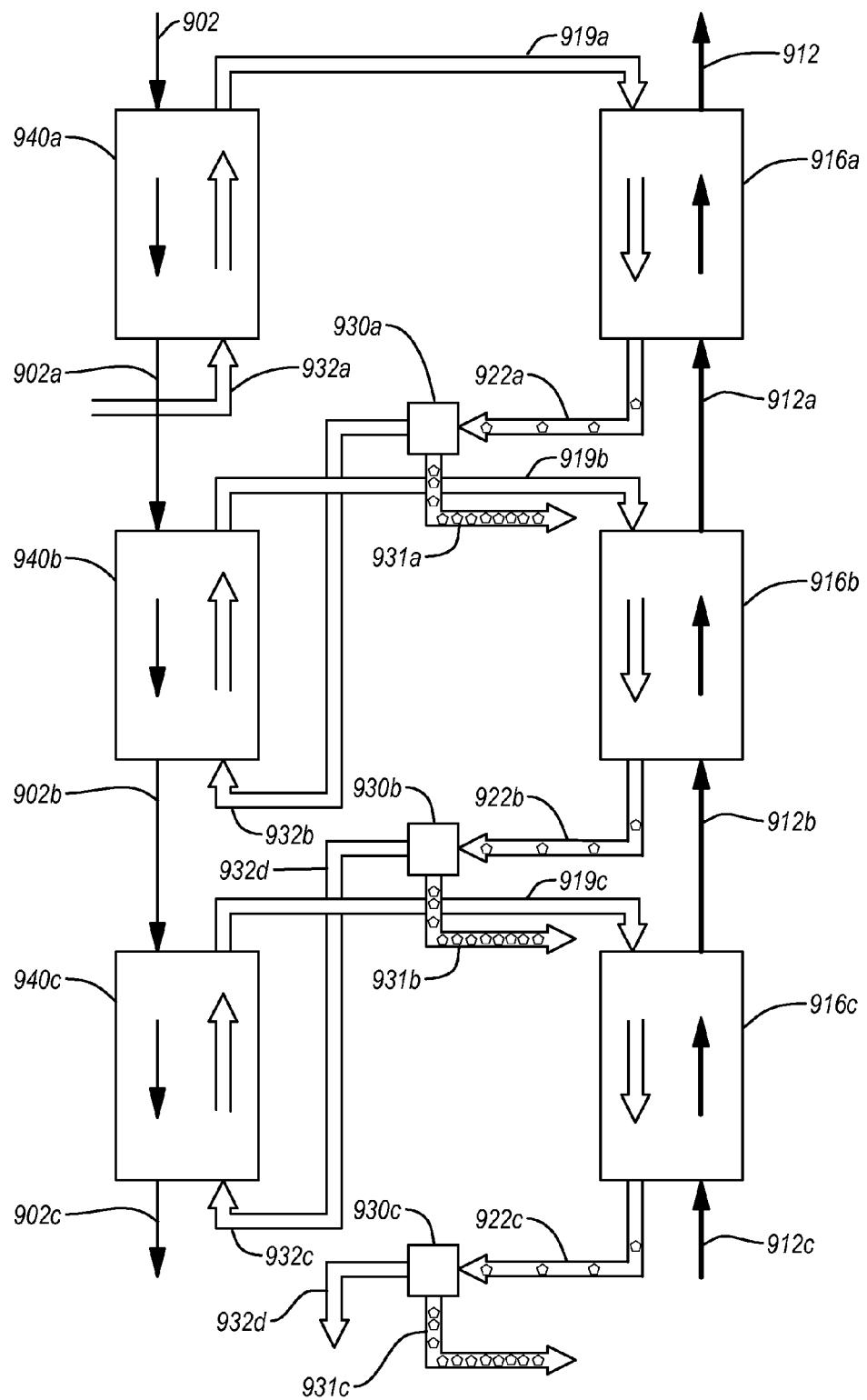
FIG. 9 shows schematic diagrams of staged systems with counter-current, co-current, and hybrid-current configurations, respectively, each system comprising three DCHEs.

As shown in FIG. 9A, heat exchanger 940a operates with counter-current cooling stream 902a and NVHEL 932a. Similarly, heat exchangers 940b and 940c operate in a similar configuration. In FIG. 9A, DCHE 916a also operates in a counter current manner as indicated by the arrows of process stream 912a and NVHEL 919a. Similarly, DCHE 916b and DCHE 916c operates in a counter flow manner.

Figure 9B:
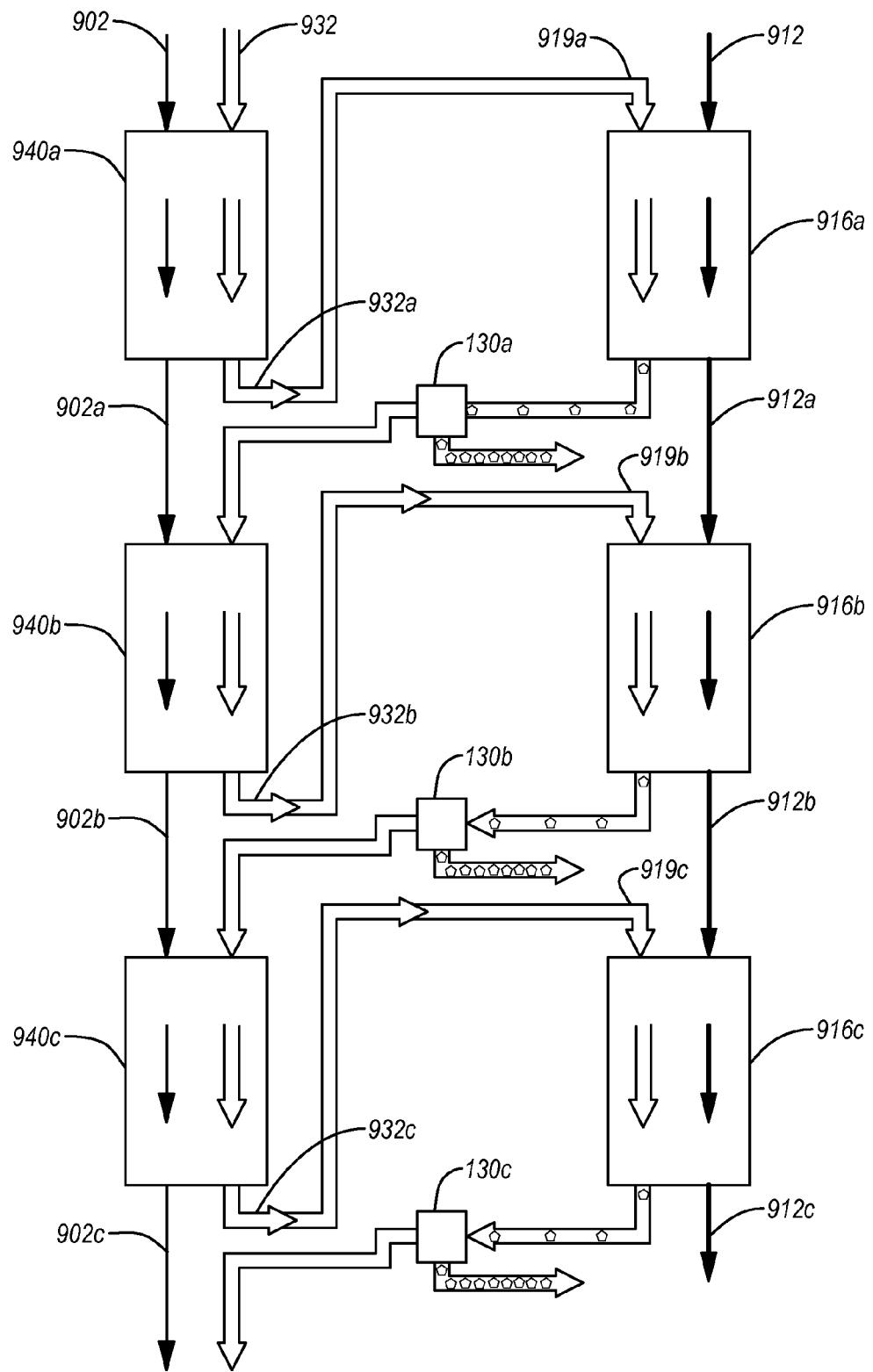

FIG. 9B shows heat exchanger 940a operating in a cocurrent flow as illustrated by the arrows showing the same flow direction of flow for cooling stream 902a and NVHEL 932a. Similarly heat exchangers 940b and 940c are shown operating in cocurrent flow. In FIG. 9B DCHE 916a is also operated in cocurrent flow as indicated by the direction of flow of process stream 912a and NVHEL 919a. DCHE 916b and 916c are shown in FIG. 9B operating in cocurrent flow.

Figure 9C:
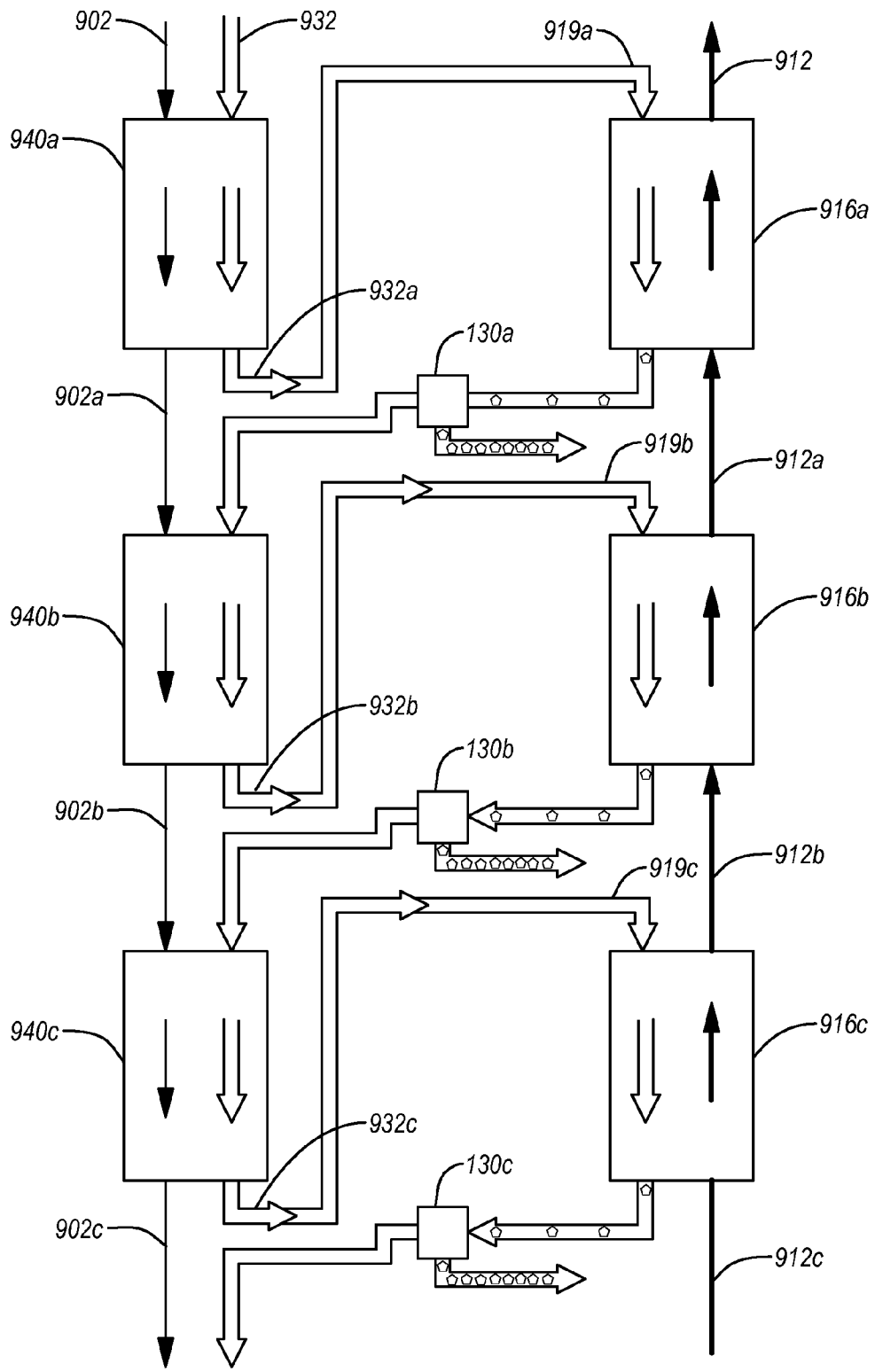

FIG. 9C shows a hybrid of FIGS. 9A and 9B in which heat exchangers 940a, 940b, and 940c operate in a cocurrent flow and DCHE 916a, 916b, and 916c are operated in a counter current flow. Other configurations can also be used, including all or a portion of the heat exchangers 940 operated counter current and all or a portion of DCHE 916 operated in cocurrent. The design shown in FIG. 9C has the advantage of being gravity driven with relatively small efficiency losses in the cocurrent sections. The same can be accomplished by making the opposite side cocurrent, which may be more realistic in practice since direct contact exchangers in some cases may be difficult to maintain in countercurrent mode.

II. Methods for Condensing Vapors

The present invention includes methods for condensing vapors from a process stream using a direct contact heat exchanger (DCHE). In one embodiment, the method includes (i) providing a process stream that includes condensable vapors and light gases; (ii) cooling the process stream using one or more up-stream heat exchangers; (iii) providing a DCHE including a non-volatile or minimally volatile heat exchange liquid (NVHEL) within a vessel; (iv) introducing the process stream into the DCHE downstream from the one or more up-stream heat exchanger, causing the process stream to directly contact the NVHEL; (v) cooling the process stream with the NVHEL at a temperature and pressure sufficient to cause at least a portion of the condensable vapors in the process stream to desublimate, forming cooled light gases and a slurry comprising desublimated solids and the NVHEL; (v) separating the light gases from the solids to produce a separated light-gas stream and removing the separated light-gas stream from the vessel through a light-gas outlet; and (vi) separating at least a portion of the desublimated solids from the NVHEL.

The step of providing the process stream can include providing conduits, pumps, valves, and/or other hardware suitable for delivering a gas from a process plant to a separation unit such as system 100 or system 800 described above. The processing plant can be a hydrocarbon plant such as a coal fired, liquid fuel fired, or gas-fired power plant. Alternatively, the process stream can be a flue gas from a chemical processing plant such as a refinery. The process stream includes at least one condensable vapor. In a preferred embodiment, the condensable vapor is carbon dioxide.

The process stream is cooled to a temperature just above the dew point or frost point of the condensable vapor before being introduced into the DCHE. In some applications, residual moisture or other condensable species may always be present in the flue gas, in which case DCHE systems may be used for all stages of cooling. The dew point or frost point of the condensable vapor depends on the particular condensable vapor and the pressure of the system. For example, the frost point of carbon dioxide at near ambient pressures is about −78° C. Those skilled in the art are familiar with calculating the frost or due point of various condensable vapors in the process stream. The process stream can be cooled to within about 10 degrees of the dew point or frost point of the condensable vapor, more preferably about 5, and most preferably within about 2. Cooling the process stream can be carried out using any technique, including those described above with regard to system 10 or system 800. For example, the methods can include drying the process stream by removing water and/or removing impurities from the process stream.

In one embodiment, process stream 812 is purified prior to being introduced into vessel by condensation in one or more heat exchangers. Impurities that can be removed by condensation include, but are not limited mercury, $NO_x$, and/or $SO_x$. In one embodiment, the purified process stream can have less than about 1 ppm mercury, less than about 1 ppm sulfur, and less than 1 ppm oxides of nitrogen except NO, which can exist at much higher concentrations because of its high volatility even at low temperatures.

Additional details regarding systems and methods for cooling and/or purifying a process stream can be found in Applicants' co-pending PCT application serial number PCT US2008/085075, which is hereby incorporated by reference. The method includes the step of introducing the cooled process stream into a particle bed under conditions suitable for condensing the condensable vapors onto a solid surface.

In one embodiment, the pressure in the vessel can be relatively low, such as a pressure in a range from about ambient pressure to about 15 psi or ambient to about 10 psi, or ambient to about 5 psi. In an alternative embodiment, the pressure can be relatively high such as in a range from about 5 psi to about 1000 psi or greater or 20 psi to about 500 psi. The desired pressure within the vessel can be provided using one or more compressors and/or fans upstream from the vessel.

The temperature within the DCHE can be in a range from about −80° C. to about −120° C., or about −100° C. to about −135° C., or about −100° C. to about −145° C. The temperature of the DCHE is provided by the NVHEL. In a preferred embodiment, the DCHE has a temperature below the frost point or dew point of the condensable vapor within the process stream. In one embodiment, the temperature of the DCHE is 30° C. to 40° C. degrees below the dew point or frost point, or 40° C. to 55° C. degrees below the dew point or frost point, or 40° C. to 65° C. degrees below the dew point or frost point. The amount of condensable vapor removed by the DCHE depends on the lowest temperature attained by the flue gas.

The process stream is injected into the vessel through a distribution apparatus and caused to directly contact the NVHEL under conditions that cause condensation of the condensable vapors. As the process stream flows through NVHEL in a direct contact zone, the temperature of the process stream drops below the dew point or frost point of the condensable vapors, which condense on the contact surface of the NVHEL. As the condensed vapors are suspended in the NVHEL and are separated from gases in the process stream that have a condensation point below that of the condensable vapors, the remaining gases in the process stream (e.g., nitrogen) form a light-gas stream that exits the vessel through a light-gas outlet.

This separation technique can advantageously be carried out in a continuous or semi-continuous process in which the condensable vapors desublimate in the NVHEL, forming a slurry including solids and NVHEL. The solids and NVHEL can be removed using any technique such as a valve, pump and/or an auger. The amount of solids removed during operation at steady state approximates the amount of vapor condensed or desublimated in the process within normal process variation or may be greater or less than this amount in transient operation.

In one embodiment, the method includes operating the DCHE unit in a steady state in which a rate of buildup of desublimated solids in the DCHE is about the same as a rate of removal of desublimated solids therefrom as a result of the direct contact between the process stream and the NVHEL. In one embodiment, the removal of condensed vapors from the DCHE vessel is sufficient to allow continuous operation of the vessel for at least days, weeks, or even months without accumulating condensed solids in the DCHE vessel.

In a preferred embodiment, the separation unit is operated economically by recovering a portion of the energy used to cool the process stream upstream from the vessel. In this embodiment, the process stream upstream from the vessel is cooled using a recuperative upstream heat exchanger that is cooled using the separated light-gas stream as the coolant.

In one embodiment, the condensable vapors in the process stream comprise $CO_2$ and impurities such as $SO_2$, $SO_3$, $NO_2$, $N_2O$, HCl, mercury compounds, and arsenic compounds, and other trace gas impurities. The impurities can be separated from $CO_2$ at a later stage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for separating condensable vapors from light gases by desublimating the condensable vapors, comprising:

a heat exchanger configured to precool a condensable-vapor-containing process stream;

a direct contact heat exchanger (DCHE) vessel downstream from the heat exchanger, the DCHE vessel including a non-volatile heat exchange liquid (NVHEL) within a vessel, the vessel having a process stream inlet, a light gas outlet, and a desublimated solids outlet, the process stream inlet configured to cause a precooled condensable-vapor-containing process stream received from the heat exchanger to directly contact the NVHEL within the DCHE vessel, wherein the system is configured to cool the NVHEL to a temperature and pressure such that direct contact of the NVHEL with the process stream causes the condensable vapors to desublimate and form separated cool gases and a slurry comprising desublimated solids and the NVHEL, the separated light-gas stream exiting the DCHE vessel through the light gas outlet, the desublimated solids exiting the DCHE vessel through the desublimated solids outlet; and
a solids separator that separates at least a portion of the desublimated solids from the NVHEL.

2. A system as in claim 1, wherein the solids separator is downstream from the desublimated solids outlet of the DCHE vessel.

3. A system as in claim 1, further comprising a fluid recirculation loop that provides a fluid path from the desublimated solids outlet to the NVHEL inlet of the DCHE vessel and comprising a recirculation heat exchanger.

4. A system as in claim 3, wherein the light gas outlet is coupled to the recirculation heat exchanger to cool the NVHEL.

5. A system as in claim 1, wherein the process stream inlet is in fluid communication with a flue gas source.

6. A system as in claim 1, configured to operate at a pressure within a range from about 5 psi pressure to about 500 psi.

7. A system as in claim 1, configured to operate at a pressure within a range from about atmospheric pressure to about 5 psi.

8. A system as in claim 1, the heat exchanger comprising a recuperative upstream heat exchanger configured to cool the process stream upstream from the DCHE vessel using the separated light gases downstream from the light gas outlet of the DCHE vessel.

9. A system as in claim 1, the heat exchanger comprising a recuperative upstream heat exchanger configured to cool the process stream upstream from the DCHE vessel using the separated solids downstream from the solids outlet of the DCHE vessel.

10. A system as in claim 1, wherein the DCHE vessel includes a plurality of porous dividers configured to cause contact between the NVHEL and the process stream.

11. A system for separating condensable vapors, comprising a plurality of staged subsystems, wherein each subsystem includes the system as in claim 1, wherein the DCHE vessels of the staged subsystems are staged to provide solids removal over a range of temperatures and conditions and wherein the staging preserves counter-current heat exchange in the heat exchangers of the staged subsystems or provides cross current or co-current heat exchange, or a combination thereof.

12. A system as in claim 1, wherein the NVHEL inlet is in fluid communication with an interior sprayer that produces NVHEL droplets in the DCHE vessel.

13. A system as in claim 1, wherein the DCHE vessel includes a distribution apparatus in fluid communication with the process stream inlet that injects the process stream into the NVHEL.

14. A system as in claim 1, further comprising at least one of a valve, pump or auger for removing a slurry containing the NVHEL and desublimated solids from the DCHE vessel.

15. A method for separating condensable vapors from gases by sublimating the condensable vapors, comprising:
providing a process stream that includes condensable vapors and light gases;
cooling the process stream using one or more up-stream heat exchangers;
contacting the process stream with a non-volatile heat exchange liquid (NVHEL);
desublimating the condensable vapors within the NVHEL to form cooled light gases and a slurry comprising desublimated solids and the NVHEL;
separating the slurry from the cooled light gases to produce a separated light-gas stream; and
separating at least a portion of the desublimated solids from the NVHEL.

16. A method as in claim 15, wherein the NVHEL is selected from the group consisting of methyl cyclopentane, methyl cyclohexane, a fluorinated or chlorinated hydrocarbons, or a combination thereof.

17. A method as in claim 15, wherein the desublimated solids are separated from the NVHEL either before or after pressurizing the slurry.

18. A method as in claim 15, wherein the NVHEL separated from the desumblimated solids is reused in the contacting step.

19. A method as in claim 18, wherein the separated light-gas stream is used in a recirculation heat exchanger to cool the recirculating NVHEL.

20. A method as in claim 19, further comprising cooling the process stream to a temperature within a range from the desublimation temperature of carbon dioxide to approximately two degrees Celsius above the desublimation temperature before contacting the process stream with the NVHEL.

21. A method as in claim 15, further comprising desublimating or condensing one or more process stream impurities.

22. A system for separating condensable vapors from light gases by desublimating the condensable vapors, comprising:
a direct contact heat exchanger (DCHE) vessel including a non-volatile heat exchange liquid (NVHEL) within a vessel, the vessel having a process stream inlet, a light gas outlet, and a desublimated solids outlet, the process stream inlet configured to cause a condensable-vapor-containing process stream to directly contact the NVHEL within the DCHE vessel,
wherein the system is configured to cool the NVHEL to a temperature and pressure such that direct contact of the NVHEL with the process stream causes the condensable vapors to desublimate and form separated cool gases and a slurry comprising desublimated solids and the NVHEL,
the separated light-gas stream exiting the DCHE vessel through the light gas outlet,
the desublimated solids exiting the DCHE vessel through the desublimated solids outlet;
a solids separator that separates at least a portion of the desublimated solids from the NVHEL; and
a fluid recirculation loop that provides a fluid path from the desublimated solids outlet to the NVHEL inlet of the DCHE and comprises a recirculation heat exchanger, wherein the light gas outlet is coupled to the recirculation heat exchanger to cool the NVHEL.

23. A system for separating condensable vapors from light gases by desublimating the condensable vapors, comprising:
a direct contact heat exchanger (DCHE) vessel including a non-volatile heat exchange liquid (NVHEL) within a vessel, the vessel having a process stream inlet, a light gas outlet, and a desublimated solids outlet, the process stream inlet configured to cause a condensable-vapor-containing process stream to directly contact the NVHEL within the DCHE vessel,
wherein the system is configured to cool the NVHEL to a temperature and pressure such that direct contact of the NVHEL with the process stream causes the condensable vapors to desublimate and form separated cool gases and a slurry comprising desublimated solids and the NVHEL,
the separated light-gas stream exiting the DCHE vessel through the light gas outlet,
the desublimated solids exiting the DCHE vessel through the desublimated solids outlet;

a solids separator that separates at least a portion of the desublimated solids from the NVHEL; and
a recuperative upstream heat exchanger configured to cool the process stream upstream from the DCHE vessel using at least one of (i) the separated light gases downstream from the light gas outlet of the DCHE vessel or (ii) the separated solids downstream from the solids outlet of the DCHE vessel.

24. A system for separating condensable vapors from light gases by desublimating the condensable vapors, comprising:
a direct contact heat exchanger (DCHE) vessel including a non-volatile heat exchange liquid (NVHEL) within a vessel, the vessel having a process stream inlet, a light gas outlet, and a desublimated solids outlet, the process stream inlet configured to cause a condensable-vapor-containing process stream to directly contact the NVHEL within the DCHE vessel,
wherein the system is configured to cool the NVHEL to a temperature and pressure such that direct contact of the NVHEL with the process stream causes the condensable vapors to desublimate and form separated cool gases and a slurry comprising desublimated solids and the NVHEL,
the separated light-gas stream exiting the DCHE vessel through the light gas outlet,
the desublimated solids exiting the DCHE vessel through the desublimated solids outlet,
wherein the DCHE vessel includes a plurality of porous dividers configured to cause contact between the NVHEL and the process stream; and
a solids separator that separates at least a portion of the desublimated solids from the NVHEL.

25. A system for separating condensable vapors from light gases by desublimating the condensable vapors, comprising:
a direct contact heat exchanger (DCHE) vessel including a non-volatile heat exchange liquid (NVHEL) within a vessel, the vessel having a process stream inlet, a light gas outlet, and a desublimated solids outlet, the process stream inlet configured to cause a condensable-vapor-containing process stream to directly contact the NVHEL within the DCHE vessel,
wherein the system is configured to cool the NVHEL to a temperature and pressure such that direct contact of the NVHEL with the process stream causes the condensable vapors to desublimate and form separated cool gases and a slurry comprising desublimated solids and the NVHEL,
the separated light-gas stream exiting the DCHE vessel through the light gas outlet,
the desublimated solids exiting the DCHE vessel through the desublimated solids outlet,
wherein the DCHE vessel includes a distribution apparatus in fluid communication with the process stream inlet that injects the process stream into the NVHEL; and
a solids separator that separates at least a portion of the desublimated solids from the NVHEL.

26. A system for separating condensable vapors from light gases by desublimating the condensable vapors, comprising:
a plurality of staged subsystems, wherein each subsystem includes:
a direct contact heat exchanger (DCHE) vessel including a non-volatile heat exchange liquid (NVHEL) within a vessel, the vessel having a process stream inlet, a light gas outlet, and a desublimated solids outlet, the process stream inlet configured to cause a condensable-vapor-containing process stream to directly contact the NVHEL within the DCHE vessel,
wherein the system is configured to cool the NVHEL to a temperature and pressure such that direct contact of the NVHEL with the process stream causes the condensable vapors to desublimate and form separated cool gases and a slurry comprising desublimated solids and the NVHEL,
the separated light-gas stream exiting the DCHE vessel through the light gas outlet,
the desublimated solids exiting the DCHE vessel through the desublimated solids outlet; and
a solids separator that separates at least a portion of the desublimated solids from the NVHEL,
wherein the DCHE vessels of the staged subsystems are staged to provide solids removal over a range of temperatures and conditions and wherein the staging preserves counter-current heat exchange in the heat exchangers of the staged subsystems or provides cross current or co-current heat exchange, or a combination thereof.

27. A method for separating condensable vapors from gases by sublimating the condensable vapors, comprising:
providing a process stream that includes condensable vapors and light gases;
cooling the process stream using one or more up-stream heat exchangers to a temperature within a range from the desublimation temperature of carbon dioxide to approximately two degrees Celsius above the desublimation temperature;
providing a direct contact heat exchanger (DCHE) including a non-volatile heat exchange liquid (NVHEL) within a vessel;
introducing the cooled process stream from the one or more up-stream heat exchangers into the DCHE and desublimating the condensable vapors within the NVHEL to form cooled light gases and a slurry comprising desublimated solids and the NVHEL;
separating the slurry from the cooled light gases to produce a separated light-gas stream;
separating at least a portion of the desublimated solids from the NVHEL;
recirculating the NVHEL to the DCHE after separation from the desublimated solids;
using the separated light-gas stream in a recirculation heat exchanger to cool the recirculating NVHEL.

* * * * *

UNITED STATES PATENT AND TRADEMARK OFFICE
CERTIFICATE OF CORRECTION

PATENT NO.        : 8,764,885 B2
APPLICATION NO.   : 13/301731
DATED             : July 1, 2014
INVENTOR(S)       : Baxter et al.

Page 1 of 1

It is certified that error appears in the above-identified patent and that said Letters Patent is hereby corrected as shown below:

In the Drawings

Sheet 2, replace Figure 2 with the figure depicted below, wherein "214" is added to the figure

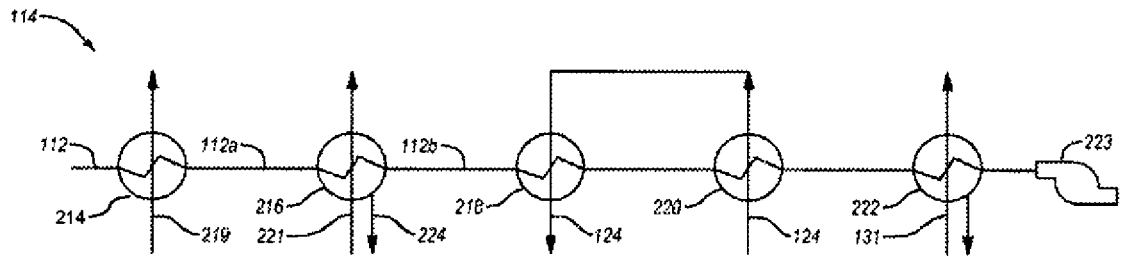

Fig. 2

In the Specification

Column 1
Line 49, change "primary because" to --primarily because--

Column 6
Line 38, change "water vapors that may exists" to --water vapors that may exist--

Signed and Sealed this
Seventh Day of April, 2015

Michelle K. Lee
*Director of the United States Patent and Trademark Office*